US012704004B2

(12) United States Patent
Kuniyil et al.

(10) Patent No.: US 12,704,004 B2
(45) Date of Patent: Aug. 11, 2026

(54) ARRESTER COMPONENT FOR A DOOR OPERATION ASSEMBLY

(71) Applicant: Illinois Tool Works Inc., Glenview, IL (US)

(72) Inventors: Nidhin Kuniyil, Pune Maharashtra (IN); Ravindra Desai, Pune Maharashtra (IN); Virupaxi Payannavar, Pune Maharashtra (IN); Amit Namannavar, Pune Maharashtra (IN)

(73) Assignee: Illinois Tool Works Inc., Glenview, IL (US)

(*) Notice: Subject to any disclaimer, the term of this patent is extended or adjusted under 35 U.S.C. 154(b) by 586 days.

(21) Appl. No.: 18/081,073

(22) Filed: Dec. 14, 2022

(65) Prior Publication Data

US 2023/0184008 A1 Jun. 15, 2023

(30) Foreign Application Priority Data

Dec. 14, 2021 (IN) ............................ 202121058192

(51) Int. Cl.
*E05B 85/10* (2014.01)
*E05B 81/76* (2014.01)
(Continued)

(52) U.S. Cl.
CPC ............ *E05B 81/76* (2013.01); *E05B 85/103* (2013.01); *E05B 85/12* (2013.01); *E05Y 2900/531* (2013.01)

(58) Field of Classification Search
CPC ....... E05B 85/10; E05B 85/103; E05B 85/107
See application file for complete search history.

(56) References Cited

U.S. PATENT DOCUMENTS 2,570,160 A * 10/1951 Schoch .................. E05B 5/003 292/1
5,457,971 A * 10/1995 Yamada .................. E05B 5/003 292/DIG. 31
(Continued)

FOREIGN PATENT DOCUMENTS

CN 111335757 A 6/2020
CN 114251031 A * 3/2022 ............. E05B 85/16
(Continued)

OTHER PUBLICATIONS

FR 847011 translation Oct. 2, 1943.*
FR 847011 human translation Oct. 2, 1943.*

*Primary Examiner* — Carlos Lugo
(74) *Attorney, Agent, or Firm* — McAndrews, Held & Malloy, Ltd.

(57) ABSTRACT

A vehicle having a door operation assembly having an internal door handle assembly, an outside door handle assembly, and an arrester component. The arrester component includes a housing, a barrier, and an activator/deactivator. When the vehicle door is in a locked state and the outside door handle is in a flush position, the activator/deactivator causes the barrier to engage with an outside door handle of the door handle assembly to arrest the movement of the door handle from the flush position to a deployed position. When the vehicle door is in the locked state and the door handle is in the deployed position, the activator/deactivator causes the barrier to disengage from the door handle to allow the movement of the outside door handle from the deployed position to the flush position.

23 Claims, 9 Drawing Sheets

(51) Int. Cl.
*E05B 85/12* (2014.01)
*E05B 79/22* (2014.01)

(56) References Cited

U.S. PATENT DOCUMENTS

| | | | | | |
|---|---|---|---|---|---|
| 5,556,145 | A * | 9/1996 | Takasaki | E05B 5/00 292/DIG. 31 |
| 6,668,602 | B2 * | 12/2003 | Graham | H04L 67/306 292/DIG. 31 |
| 7,543,863 | B2 * | 6/2009 | Herbert | E05B 85/107 292/DIG. 31 |
| 10,550,611 | B2 * | 2/2020 | Och | E05B 85/107 |
| 10,794,096 | B2 * | 10/2020 | Hamacher | E05B 5/006 |

FOREIGN PATENT DOCUMENTS

| | | | | |
|---|---|---|---|---|
| DE | 3311111 | A * | 10/1984 | |
| DE | 19642698 | A1 * | 4/1998 | E05B 79/20 |
| DE | 102004025097 | A1 * | 12/2005 | E05B 79/20 |
| DE | 202008003845 | U1 * | 8/2009 | E05B 79/20 |
| DE | 102019207511 | A1 * | 11/2020 | E05B 81/90 |
| EP | 3620599 | A1 * | 3/2020 | E05B 85/107 |
| EP | 3494268 | B1 * | 4/2021 | E05B 79/20 |
| FR | 878435 | A * | 1/1943 | |
| FR | 847011 | A * | 10/1943 | |
| GB | 2276910 | A * | 10/1994 | E05B 5/003 |
| GB | 2277957 | A * | 11/1994 | H02B 1/00 |
| WO | WO-2006010649 | A1 * | 2/2006 | E05B 85/107 |

* cited by examiner

ARRESTER COMPONENT FOR A DOOR OPERATION ASSEMBLY

CROSS-REFERENCE

The present application claims the benefit of Indian Patent Application No. 202121058192, filed Dec. 14, 2021 and titled "Arrester Component for a Door Operation Assembly," the contents of which are hereby incorporated by reference.

TECHNICAL FIELD

The present subject matter is related to, in general, vehicles, and, in particular, door operation assemblies for vehicles, substantially as illustrated by and described in connection with at least one of the figures, as set forth more completely in the claims.

BACKGROUND

A door operation assembly generally includes a door locking mechanism and a door handle assembly (inside and/or outside door handle assembly). The door handle assembly is, generally, used in vehicles to secure or lock a door of the vehicle. For aesthetic appeal of exteriors, nowadays, vehicles are provided with flush door handle assemblies. Such a door handle assembly includes a handle that is retractably mounted to the vehicle door such that the handle is flush with a metal door panel of the vehicle door, for example, the exterior of the vehicle, when not in use or undeployed. The handle may be movable between an undeployed or flush position and a deployed position. In the deployed position, the handle protrudes from the side wall for being pulled by a user to open the vehicle door or for delatching the vehicle door. In other words, the vehicle door is delatched when the user further pulls the handle from the deployed position.

BRIEF DESCRIPTION OF DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1A:
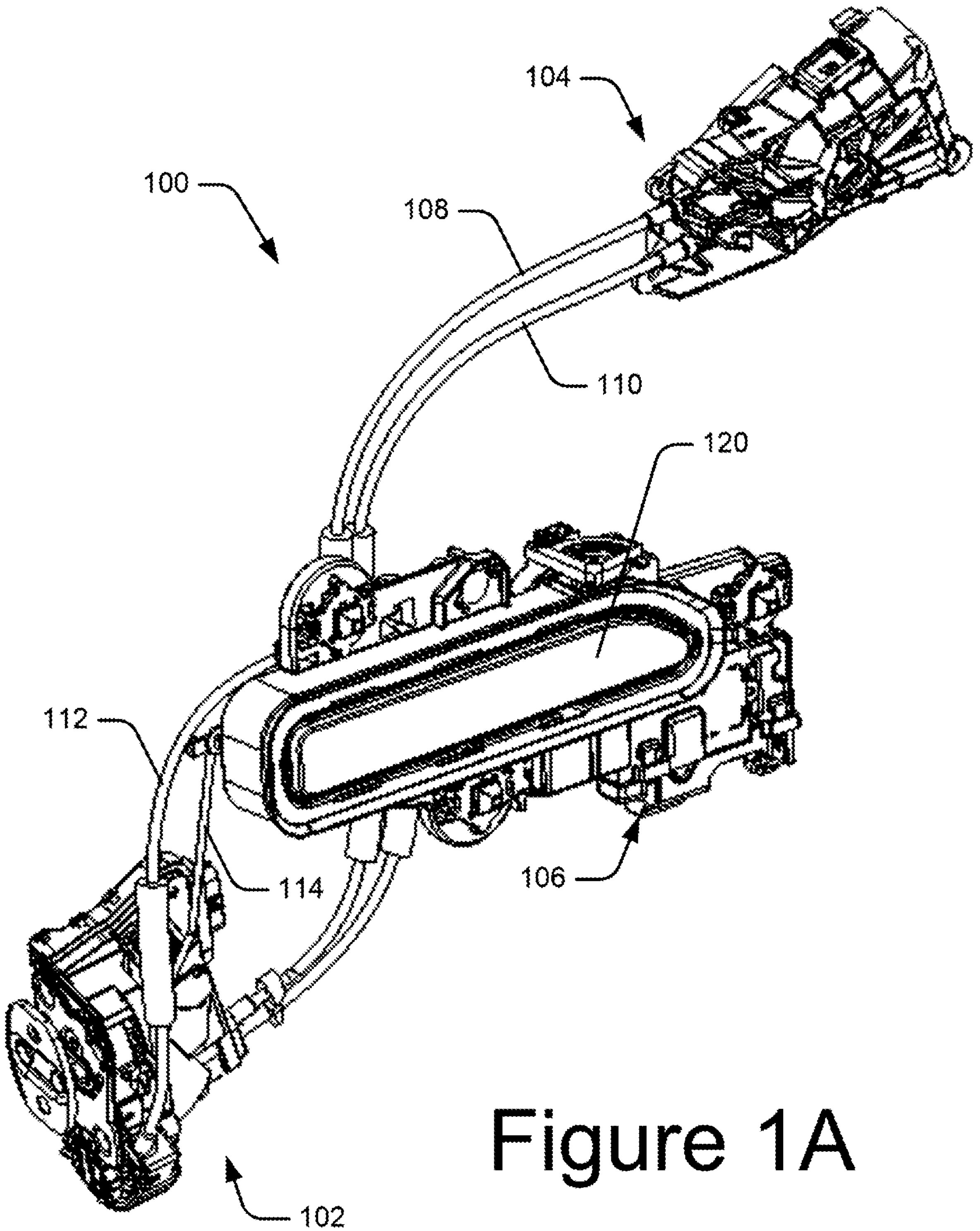
FIGS. 1A, 1B, and 2 illustrate, as an example, a conventional design of a door operation assembly.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

A door operation assembly includes a door locking mechanism, an internal door handle assembly, and an outside door handle assembly. Conventional outside door handle assemblies, such as flush door handle assemblies, that are deployed in vehicle doors may be mechanically or electrically actuated for moving the door handle between a flush position (in which the door handle is aligned with an exterior surface or a metal door panel of a vehicle door) to a deployed position (in which the door handle protrudes from the surface of the metal door panel of the vehicle door). Further, the handle may be coupled to a latching mechanism that facilitates in latching and delatching a vehicle door upon the actuation of the door handle. The door handle is movable to the deployed position, by using an electrical motor or by a mechanical setup, before being manually pulled to delatch the vehicle door. In general, the door handle on the exterior of the vehicle, including a handle actuable for opening a boot of the vehicle and referred to as outside door handle, is provisioned only for delatching the vehicle door.

On the other hand, for locking the vehicle door, the locking mechanism (which may be a part of the latching mechanism or may be separate) may be operable by a separate mode, for example, using a key of the vehicle by remotely locking the vehicle in case of a remote keyless entry (RKE)/passive keyless entry (PKE), or by turning the key in case of a manually locking vehicle. Further, the vehicle door is provided with another door handle which is on a surface facing the passenger cabin of the vehicle, referred to as the internal door handle. The internal door handle, similar to the outside door handle can also be operably coupled to the latching mechanism of the vehicle door and be operated for delatching the vehicle door from inside the passenger cabin. In addition, the inner surface of the vehicle door, facing the passenger cabin, is also provided with a lock lever which can be used for locking and unlocking the vehicle door from the inside of the vehicle. For instance, the lock lever may be separate from the internal door handle or that functionality may be integrated with the internal door handle itself. In other words, the vehicle door can be locked and unlocked from inside the passenger cabin, in addition to using the key.

Coming back to the outside door handles, various types of mechanisms are conventionally employed for deploying the outside door handle from a flush position and for resetting it from the deployed to flush position. In certain cases, the outside door handle can be operated using an electric motor. However, such assemblies have been found to be cost inefficient in terms of the cost of the electric motor and the sub-components, such as a controller and a protective cover required for its operation. At the same time, use of an electric motor for movement of the external handle may involve a complex assembly of various parts which requires space, adds to the weight of the door, and adds to the cost. In addition, upon failure of the electrical motor, the maintenance may be considerably costly. Therefore, in lieu of electrically or motor-actuated door handles assemblies, conventional systems include mechanically actuated door handle assemblies. In conventional mechanically actuated door handle assemblies, a push-push assembly may be employed for moving the external handle from the flush position to the deployed position and vice-versa. Upon actuation of the outside door handle by pushing, i.e., depressing the outside door handle in an inward direction, the external handle can be brought from one state to another. In other words, by pushing the outside door handle into the vehicle door, the outside door handle can be moved between the deploy condition and the flush position.

In such mechanically actuated door handles, as explained above, the outside door handle has to be manually actuated to be brought into flush position after being deployed. For instance, if a driver or a passenger is operating the outside door handle to enter the vehicle, then the outside door handle remains in the deployed condition, unless the driver or the passenger deliberately remembers to actuate the outside door handle to bring it in flush position. Generally, as part of the design, the keyhole for the key of the vehicle door is provided to be obscured by the outside door handle in the flush position and to be exposed for use when the outside door handle is in the deployed condition. Therefore, when the outside door handle is in the deployed condition, it may expose the keyhole to elements of nature, such as sun and rain, and contaminants, such as dirt and grime. If the keyhole remains exposed for a considerable duration, it may either require cleaning or, in case the condition is worse, repair or even replacement.

Further, if the outside door handle is in the deployed condition and if the vehicle door is unlocked, the outside door handle can be actuated to delatch and open the door. In certain cases, the delatching and opening of the door may be inadvertent, which may cause damage to the vehicle door or, worse, to the passengers. In certain other cases, leaving the outside door handle externally operable to delatch the door may make the vehicle vulnerable to unauthorized entry, jeopardizing the safety of the passengers of the vehicle.

In other scenarios, if the vehicle is parked and the vehicle door is locked, the outside door handle remains vulnerable to being operated and being actuated to be brought into the deploy condition, even though the door may not be delatchable. Even in this case, a miscreant may deploy the outside door handle leaving the keyhole exposed to elements of nature and contaminants, as explained above. In addition, repeated actuation and/or mishandling of the outside door handle by such miscreants may lead to considerable wear and tear or damage to the outside door handle, which would require the outside door handle to be repaired or replaced.

Examples of the present subject matter relating to door operation assembly for a vehicle, and an arrester component for the door operation assembly are described herein which seeks to address one or more of the abovementioned issues discussed previously.

A vehicle may include a door operation assembly. The door operation assembly includes a door locking mechanism, a latching mechanism, an internal door handle assembly, an outside door handle assembly, and an arrester component. The door locking mechanism may be disposed in a vehicle door for at least one of locking and unlocking of the vehicle door. The latching mechanism may be disposed in the vehicle door for at least one of latching and unlatching of the vehicle door. The internal door handle assembly may be provided on an interior surface of the vehicle door. The internal door handle assembly may be operably coupled to the door locking mechanism to at least one of lock and unlock the vehicle door. The internal door handle assembly may be operably coupled to the latching mechanism to delatch the vehicle door of the vehicle from an inside of the vehicle. The outside door handle assembly may be provided on an exterior surface of the door. The outside door handle assembly may include an outside door handle that is operably coupled to the latching mechanism to at least delatch the vehicle door. The outside door handle may be movable between a flush position and a deployed position. In the flush position, the outside door handle is aligned with the exterior surface of the door. In the deployed position, the outside door handle protrudes away from the exterior surface of the door.

The arrester component may include an activator/deactivator, a barrier, and a housing. The barrier may be mounted to the housing and may be movable therein. The barrier may cooperate with the outside door handle in an assembled state in the door operation assembly. The activator/deactivator may be disposed in the housing. The activator/deactivator may use an input corresponding to state of locking or unlocking of the vehicle door to cause movement of the barrier to regulate movement of the outside door handle. When the door is in a locked state and if the outside door handle is in the flush position, the activator/deactivator may cause the barrier to engage with the outside door handle to arrest the movement of the outside door handle from the from the flush position to the deployed position. Further, when the door is in the locked state and if the outside door handle is in the deployed position, the activator/deactivator may cause the barrier to disengage from the outside door handle to allow the movement of the outside door handle from the deployed position to the flush position. Furthermore, when the door is in an unlocked state, the activator/deactivator may cause the barrier to disengage from the outside door handle to allow the movement of the outside door handle.

In an aspect, the arrester component may include an arrester cable connecting the activator/deactivator to the door locking mechanism to determine the state of locking or unlocking of the vehicle door. Further, the arrester cable may move based on operation of the door locking mechanism to cause actuation of the activator/deactivator.

The internal door handle assembly may include an inside lock actuator and a door-side cable. The inside lock actuator may be actuable for locking and unlocking the vehicle door. The door-side cable may couple the inside lock actuator and the arrester cable. The door locking mechanism may include a lock-side cable coupled to the arrester cable. The actuation of the inside lock actuator may move the arrester cable through the door-side cable and the lock-side cable.

In a further aspect, the door operation assembly may include a cable splitter to couple the arrester cable to the door-side cable and the lock-side cable. The cable splitter may include a cable holder casing and a cable slider. The cable holder casing may house the cable slider. The cable slider may be slidably disposed in the cable holder casing. The cable slider may at least one of transfer and divide the movement of the lock-side cable and of the door-side cable to the arrester cable. The cable slider may include a first end and a second end opposite the first end. The first end may be coupled to the door-side cable and the arrester cable. The second end may be coupled to the lock-side cable. The cable splitter may transfer movement of the lock-side cable in substantially equal measure to the door-side cable and to the arrester cable. The cable splitter may transfer movement of the door-side cable in substantially equal measure to the lock-side cable and to the arrester cable.

In an aspect, the outside door handle assembly may include an actuator coupled to the outside door handle to actuate the outside door handle to the flush position and to the deployed position. The barrier may be engageable with the actuator of the outside door handle to regulate the movement thereof.

In an aspect, the barrier of the arrester component may include a contoured mating portion. The contoured mating portion may include a slanted contour engageable with the actuator to regulate the movement of the outside door handle. The barrier may be mounted to the housing by a first spring to be movable between a first position and a first position. The first position may be position where the barrier is closest to a central longitudinal axis of the activator/deactivator. The second position may be a position where the barrier is farthest from the central longitudinal axis of the activator/deactivator. In an aspect, the first spring may be a torsion spring to bias the barrier towards the second position. On removal of an external force on the barrier, the first spring is to enable movement of the barrier from the second position to the first position.

In another aspect, when the vehicle door is in the locked state and if the outside door handle is in the flush position, the contoured mating portion of the barrier may abut against the actuator to arrest the movement of the outside door handle from the flush position to the deployed position.

In yet another aspect, when the vehicle door is brought to the locked state from the unlocked state and if the outside door handle is in the deployed position, the slanted contour of the barrier is to move the actuator to bring the outside door handle from the deployed position to the flush position. The movement of move the actuator beyond the slanted contour and the barrier causing the barrier to return to the first position. The movement of the barrier to the first position may restrict the movement of the actuator to bring the outside door handle from the flush position to the deployed position.

In a further aspect, when the vehicle door is brought to the unlocked state from the locked state and if the outside door handle is in the flush position, the unlocking of the door may move the arrester cable. The movement of the arrester cable may cause translational movement of the activator/deactivator with respect to the barrier. The movement of the activator/deactivator may cause the movement of the barrier towards the second position. The movement of the barrier towards the second position may disengage the contoured mating portion of the barrier from the actuator. The actuator may be movable to actuate the outside door handle from the flush position to the deployed position.

In an aspect, the activator/deactivator and the barrier are in a cam-follower relationship for the movement of the activator/deactivator. An outer wall of the activator/deactivator may have a tapered profile extending along a length of the activator/deactivator.

In another aspect, the door operation assembly may include a control unit. The arrester component may be couplable to the control unit. The control unit may receive the input corresponding to the state of locking or unlocking of the vehicle and in response to the input, the control unit may actuate the barrier to regulate the outside door handle of the door operation assembly.

The door handle of the outside door handle assembly that is movable between the flush or undeployed position to the deployed position without utilizing an electric motor and, instead, by means of mechanical linkages, i.e., using a simplified mechanical assembly. The outside door handle assembly has a frame for mounting the outside door handle assembly to the vehicle door. The frame may include a housing portion and an exterior surface having a cavity facing away from the door. The door handle is disposed in the cavity and is pivoted to the frame and is movable between the undeployed/flush position and the deployed position, upon being actuated. For example, in the undeployed position, the handle remains inside the cavity and is flush with the exterior surface of the door. In the deployed position, the handle protrudes from the exterior surface of the door. The outside door handle assembly may include a push-push assembly operably coupled to the outside door handle to enable moving the outside door handle between the flush position and the deployed position. The push-push assembly is a spring-loaded component and can be moved repeatedly between its two positions or conditions—pushed-in and pushed-out—by providing a push-action to a plunger or pusher of the push-push assembly. The plunger is adapted to translate along a longitudinal axis of the push-push assembly to which an actuator of the door handle of the outside door handle assembly is operably coupled. The movement of the plunger causes the door handle to move between the flush and deployed positions. The outside door handle assembly also includes a bell crank assembly for transferring the motion between the plunger of the push-push assembly and the door handle. In an example, the bell crank assembly can be a single piece component and includes a profile having a shape that assists in moving the push-push assembly between the pushed-out (discharged) and pushed-in (recharged) condition. In another example, the bell crank assembly can be a multi-piece component in which the multiple pieces cooperate with each other to transfer the motion between the push-push assembly and the door handle.

To move the outside door handle from the deployed position to the flush position, the outside door handle is mechanically actuated, such as by pressing the outside door handle or by pushing the outside door handle. Thereafter, to bring the outside door handle back to the deployed position, the outside door handle can again be mechanically actuated. But, according to an aspect of the present subject matter, the state of locking or unlocking of the vehicle determines whether the outside door handle can be deployed from the flush position or not upon actuation/push-action. In other words, the outside door handle can be deployed from the flush position if the door is unlocked, whereas, if the door is locked, the outside door handle cannot be deployed from the flush position. In an example, the door operation assembly can employ various electronic means, such as sensors and control units, for determining the state of locking or unlocking of the vehicle to allow the outside door handle to be deployed. In another example of the present subject matter, the door operation assembly is envisaged as including a simple mechanical assembly which can, depending on the state of the vehicle door, disallow or allow the door handle to be deployed from the flush position.

According to an aspect of the present subject matter, in case the door operation assembly includes the mechanical assembly being used for regulating deployment of the door handle from the flush position, the door operation assembly includes the following features—(1) providing an arrester component (also referred to as an actuator lock) which restricts the movement of the outside door handle to the deployed position when the outside door handle is in a flush position, and (2) providing a manner of synchronization or coordination between the movement of the arrester component and the door locking mechanism of the vehicle door, such that the operation of the door locking mechanism to lock the vehicle door causes activation of the arrester component to restrain the movement of the outside door handle from the flush position to deployed position. As explained earlier, the door locking mechanism of the door can be the assembly which locks the vehicle door such that even upon actuation of the internal door handle or the outside door handle, the vehicle door does not delatch/open.

According to aspects of the present subject matter, even in case the door operation assembly includes the mechanical assembly, various modes of synchronizing the movement of the arrester component and door locking mechanism can be employed. In one example, a lock of the door locking mechanism can be mechanically coupled, for example, using a cable, to the arrester component such the arrester component is activated. In another example, sensors, mechanical or electronic, can be employed in the door operation assembly so as to achieve the synchronization between the arrester component and the lock. In said example, a control unit, based on sensorial inputs which determines the operation of the door locking mechanism to lock the door, can activate the arrester component and prevent the outside door handle from being deployed from the flush position, in case the vehicle door is in the locked state. According to further aspect of the present subject matter, the coupling between the door locking mechanism and the arrester component can be simplified and can be provided in a manner that it does not require any change in the conventional design of the door operation assembly and, in an example, the conventional door operation assembly can be retrofitted with the arrester component and the mechanism for synchronizing the movement thereof with the movement of the lock of the door locking mechanism.

The present subject matter is further described with reference to the accompanying figures. Wherever possible, the same reference numerals are used in the figures and the following description to refer to the same or similar parts. It should be noted that the description and figures merely illustrate principles of the present subject matter. It is thus understood that various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

Figure 1B:
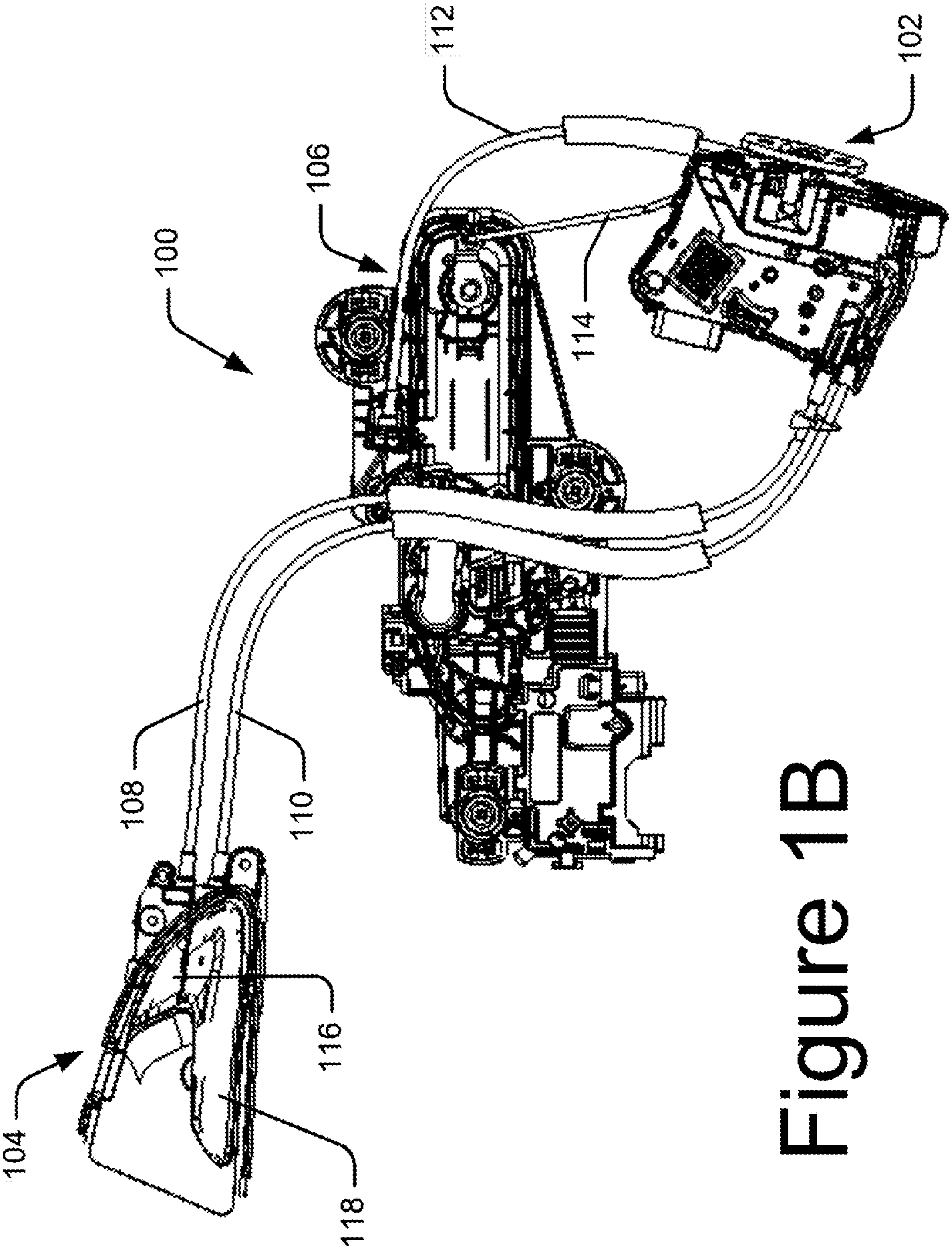
Figure 2:
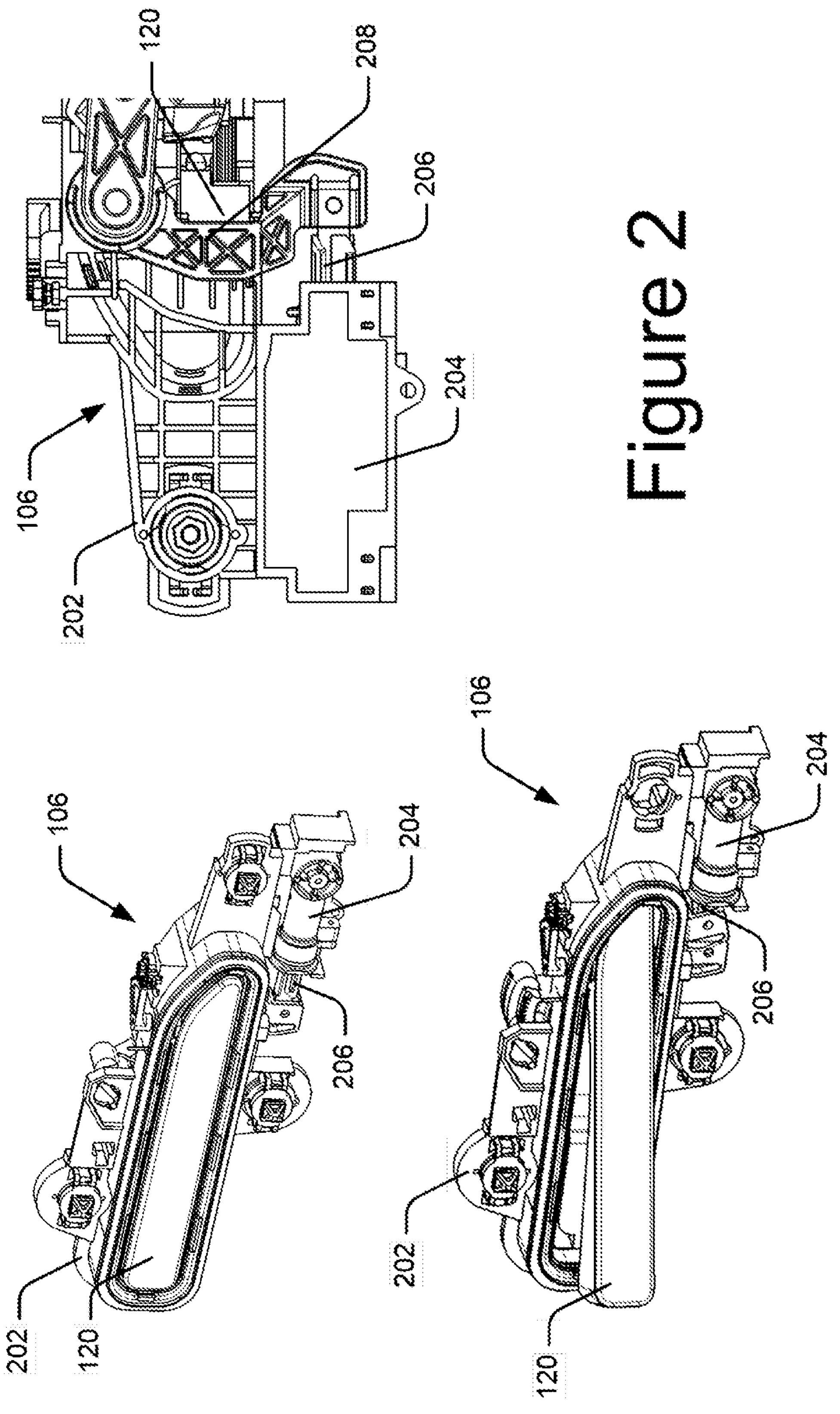

FIGS. 1A, 1B, and 2 illustrate an example of the conventional design of a door operation assembly 100. FIG. 1A illustrates a perspective view of the door operation assembly 100 and FIG. 1B illustrates a front view of the door operation assembly 100, as one example of the conventional design of the door operation assembly 100. The door operation assembly 100 includes a door locking mechanism 102, an internal door handle assembly 104, and outside door handle assembly 106. As an example, the door locking mechanism 102 and can have integrated functions of locking/unlocking the vehicle door as well as for latching/delatching the vehicle door. FIG. 2 illustrates the conventional operation of the outside door handle assembly 106.

As shown in FIGS. 1A and 1B, the door locking mechanism 102, the internal door handle assembly 104, and the outside door handle assembly 106, in the conventional design, are connected by various cables for their operation. In said example, FIGS. 1A and 1B illustrate a 3-cable door locking mechanism. Accordingly, the internal door handle assembly 104 is connected to the door locking mechanism 102 by two cables, namely an inside lock/unlock cable 108 and an inside delatch cable 110, and the outside door handle assembly 106 is connected to the door locking mechanism 102 by an outside delatch cable 112. In addition, the door locking mechanism 102 is operably connected to a keyhole in the outside door handle assembly 106 using a link rod 114 which can be used for operating the door locking mechanism 102 for locking and unlocking the vehicle door from the outside. In another case, where the door locking mechanism 102 is a 2-cable door locking mechanism, the internal door handle assembly 104 may integrate the functions of locking and latching and may, in comparison to the 3-cable door locking mechanism, have a single cable connecting the door locking mechanism 102 to the internal door handle assembly 104.

In operation, the internal door handle assembly 104 can be operated to either lock/unlock the vehicle door or to delatch the vehicle door (to open the vehicle door when the vehicle door is unlocked). The operation of locking and unlocking is achieved by the movement of an inside lock actuator 116 of the internal door handle assembly 104 to operate a lock of the door locking mechanism 102 via the inside lock/unlock cable 108. Further, the delatching of the vehicle door is achieved by the movement of an internal door handle 118 of the internal door handle assembly 104 which actuates a latching mechanism of the door locking mechanism 102 via the inside delatch cable 110. On the other hand, the outside door handle assembly 106 is to only to cause delatching operation since an outside door handle 120 of the outside door handle assembly 106 is connected only to a latching mechanism of the door locking mechanism 102 via the outside delatch cable 112. Therefore, when the outside door handle 120 is actuated, the mechanical connection via the outside delatch cable 112 causes the latching mechanism to be operated which causes the vehicle door to be delatched.

FIG. 2 illustrates the deployment of the outside door handle 120 in the conventional outside door handle assembly 106. As explained earlier, outside door handle 120 is movable between the flush or undeployed position and the deployed position. The outside door handle assembly 106 has a frame 202 for mounting the outside door handle assembly 106 to the vehicle door. The frame 202 may include a cavity in which the outside door handle 120 is disposed and is pivoted to the frame to be movable between the undeployed/flush position and the deployed position, upon being actuated. For example, in the undeployed position, the outside door handle 120 remains inside the cavity and is flush with the exterior surface of the door. In the deployed position, the outside door handle 120 protrudes from the exterior surface of the door. In addition, the outside door handle assembly 106 includes a push-push assembly 204 operably coupled to the outside door handle 120 and is a spring-loaded component that can be moved repeatedly between its two positions or conditions—pushed-in and pushed-out—by providing a push-action to a plunger 206 (pusher) of the push-push assembly 204. The plunger 206 can translate along a longitudinal axis of the push-push assembly 204 to which an actuator 208 of the outside door handle assembly 106 is operably coupled. The movement of the plunger 206 causes the outside door handle 120 to move between the flush and deployed positions. In an example, the actuator 208 can be a bell crank assembly for transferring the motion between the plunger 206 of the push-push assembly 204 and the outside door handle 120. In an example, the bell crank assembly can be a single piece component and includes a profile having a shape that assists in moving the plunger 206 so that the push-push assembly 204 is moved between the pushed-out (discharged) and pushed-in (recharged) condition. In another example, the bell crank assembly can be a multi-piece component in which the multiple pieces cooperate with each other to transfer the motion between the push-push assembly 204 and the outside door handle 120.

To move the door handle from the deployed position to the flush position, the outside door handle 120 is mechanically actuated, such as by pressing the outside door handle 120 or by pushing the outside door handle 120. Thereafter, to bring the outside door handle 120 back to the deployed position, the outside door handle 120 has to be mechanically actuated again. Such a conventional outside door handle assembly 106 has various issues discussed previously and which the aspects of present subject matter seek to address.

Figure 3A:
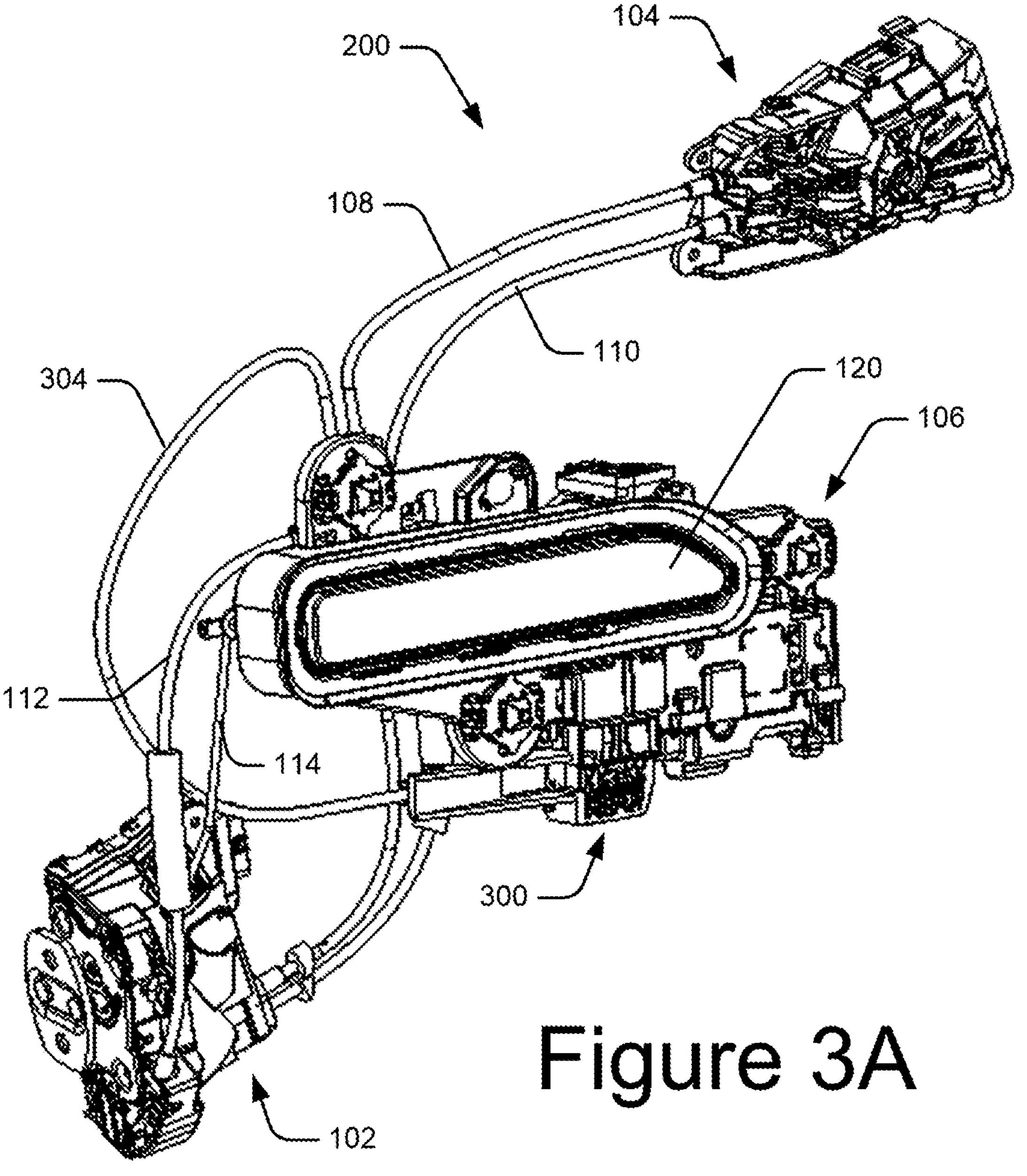
FIG. 3A illustrates a door operation assembly, according to an example of the present subject matter.
Figure 3B:
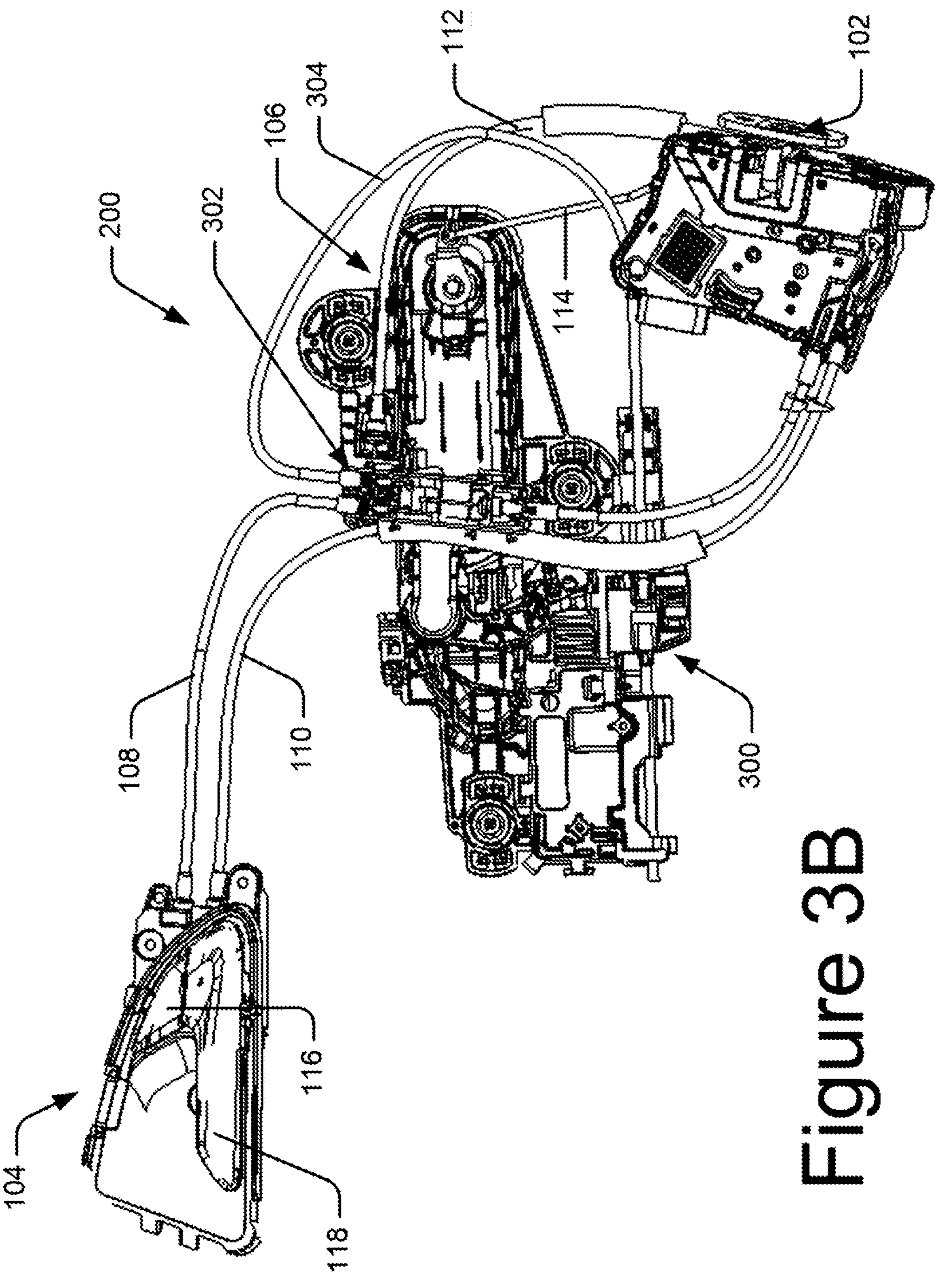
FIG. 3B illustrates a door operation assembly, according to an example of the present subject matter.

The description of the Figures, henceforth, relates to the various aspects and examples of the present subject matter. FIGS. 3A and 3B illustrate the door operation assembly 200, accordance with aspects and examples of the present subject matter. Various components of the door operation assembly 200 have been described with reference to FIGS. 1A and 1B and the same components are not repeated with references to FIGS. 3A and 3B for the sake or brevity.

According to an aspect of the present subject matter, the state of locking or unlocking of the vehicle determines whether the outside door handle 120 can be deployed from the flush position or not upon actuation/push-action. According to one example, the door operation assembly 100 includes the following features—(1) a provision for restricting the movement of the outside door handle to the deployed position when the outside door handle is in a flush position, and (2) a provision for synchronization or coordination the door locking mechanism 102 of the vehicle door with the provision in (1), such the operation of the door locking mechanism 102 to lock the vehicle door causes activation of the provision to restrain the movement of the outside door handle 120 from the flush position to deployed position.

In an example, the door operation assembly 200 can employ various electronic means, such as sensors and control units, for determining the state of locking or unlocking of the vehicle to allow the outside door handle 120 to be deployed. In said example, the door operation assembly 200 can include a control unit (not shown) to obtain the input from the sensor regarding the state of locking of the vehicle door and, accordingly, arrest the movement of the outside door handle 120 from the flush state to the deployed state.

Accordingly, in an example, the door operation assembly 200 can include an arrester component 300 which can be activated, for example, by the control unit to cooperate with the outside door handle assembly 106 and arrest the movement of the outside door handle 120 to the deployed condition when the vehicle is in the locked state. At the same time, according to said example, if the vehicle is in the locked state, but the outside door handle 120 is already in the deployed state, the arrester component 300 can allow the outside door handle 120 to be brought into the flush position and, once so brought, the arrester component 300 then does not allow the outside door handle 120 to be brought back into the deployed condition, so long as the vehicle is locked.

In another example of the present subject matter, the arrester component 300, instead of being an electronically-activated component, as described above, can be a simple mechanical assembly which can, depending on the state of locking the vehicle door, disallow or allow the outside door handle 120 to be deployed from the flush position. Even in case of the arrester component 300 is a mechanical assembly, various modes of synchronizing the movement of the arrester component 300 and the door locking mechanism 102 can be employed.

For instance, in one case, sensors, mechanical or electronic, can be employed in the door operation assembly 200 so as to achieve the synchronization between the arrester component and the lock. In said example, the sensors can track and sense the movement of the lock of the door locking mechanism 102 to lock or unlock the vehicle door and provide the information to the control unit. The control unit in turn can activate the arrester component 300 and prevent the outside door handle 120 from being deployed from the flush position, when the lock of the door locking mechanism 102 is brought into the locked state. It is to be understood that the example discussed here may be one implementation of the previous example, in which the sensors have been described to be used for determining the state of locking of the vehicle door. However, other modes of determining the state of locking of the vehicle door to activate or deactivate the arrester component 300 are envisaged as being part of the present subject matter.

In another case, as shown in FIGS. 3A and 3B, the door operation assembly 200 can be a purely mechanical component, i.e., the lock of the door locking mechanism 102 can be mechanically coupled to the arrester component 300 for the arrester component 300 to be activated when the vehicle door is locked. The mechanical coupling between the door locking mechanism 102 and the arrester component 300 is achieved by way of a cable. The actuation of the lock causes the movement of the arrester component 300 and such movement can activate the arrester component 300, as will be discussed in detail later.

According to one example, to simplify the coupling between the door locking mechanism 102 and the arrester component 300 with minimal or no modification in the conventional design of the door operation assembly 100, the cable connecting the door locking mechanism 102 and the arrester component 300 can be split from the inside lock/unlock cable 108. In other words, the inside lock/unlock cable 108 which connects the inside lock actuator 116 to the lock is split and the split cable that is taken from the inside lock/unlock cable 108 is connected to the arrester component 300. In an example, the splitting of the inside lock/unlock cable 108 may not refer to actual breaking of the cable 108 into two but only a split in the movement, i.e., the movement of the inside lock/unlock cable 108 due to the movement of the inside lock actuator 116 or when the lock of the door locking mechanism 102 is operated, is passed on to or causes movement of this cable into which the inside lock/unlock cable 108 is split. In other examples, the inside lock/unlock cable 108 can be physically split to cause split in the movement. Further, such a design allows for retrofitting the conventional door operation assemblies 100 with the components envisaged by the present subject matter, such as the arrester component 300 and a cable splitter (discussed later), to enable the conventional door operation assemblies 100 to operate in accordance with the aspects discussed herein with respect to the present subject matter.

Various ways of splitting the inside lock/unlock cable 108, for instance, movement of the inside lock/unlock cable 108 are envisaged. In one example, as shown in FIGS. 3A and 3B, the inside lock/unlock cable 108 can be provided with a cable splitter 302 which can be used to split the inside lock/unlock cable 108 into the inside lock/unlock cable which connects the inside lock actuator 116 and the door locking mechanism 102 and, an arrester cable 304 which connects the door locking mechanism 102, i.e., the lock, to the arrester component 300.

Figure 4:
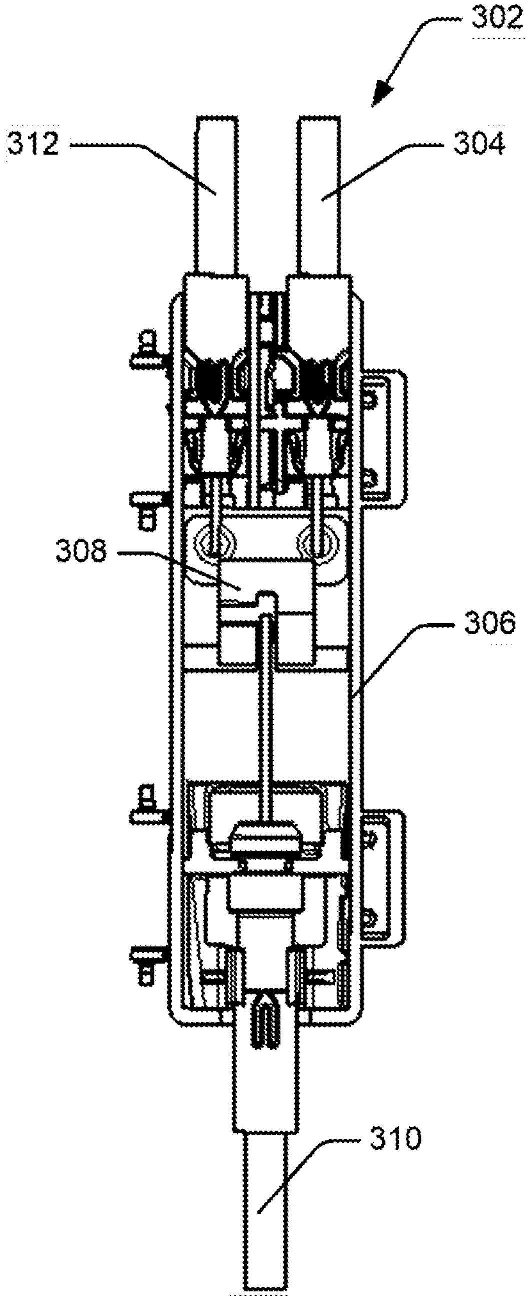
FIG. 4 illustrates a cable splitter of a door operation assembly, according to example implementations of the present subject matter.

FIG. 4 illustrates a detailed view of the cable splitter 302, according to an example of the present subject matter. As mentioned previously, the cable splitter 302 splits the inside lock/unlock cable 108 and, therefore, facilitates in the dividing the movement or actuation of the lock of the door locking mechanism 102 between the inside lock/unlock cable 108 and the arrester cable 304. However, in another case, the movement of the inside lock actuator 116 can also be divided and passed on to the arrester cable 304 to actuate the arrester component 300. Therefore, it is the locking and unlocking movement (whether caused by the operation of the lock of the door locking mechanism, for instance, by the key of the vehicle, or caused by the actuation of the inside lock actuator but for locking or unlocking the vehicle) which is passed on to the arrester cable 304.

In an example, the cable splitter 302 can include a cable holder casing 306 which can house a cable slider 308 which can be used to split the movement of the inside lock/unlock cable 108. In said example, the inside lock/unlock cable 108 can be split into a lock-side cable 310 and a door-side cable 312 connected at two ends of the cable slider 308 such that there is no loss in motion between the lock-side cable 310 and the door-side cable 312 and, the two operate as if the inside lock/unlock cable 108 has not been split. In addition, the arrester cable 304 is also coupled to one end of the cable slider 308 such that any movement of the cable slider 308, either due to pull/push from the lock-side cable 310 or pull/push from the door-side cable 312, causes the movement of the arrester cable 304, thereby causing movement of the arrester component 300.

In an example, an equal division of the movement is achieved which means that the same movement of the lock of the door locking mechanism 102, for locking or unlocking the vehicle door, i.e., of the lock-side cable 310, causes substantially equal movement of the door-side cable 312 as well as of the arrester cable 304. In the same manner, the same movement of the inside lock actuator 116, for locking or unlocking the vehicle door, i.e., of the door-side cable 312, causes substantially equal movement of the lock-side cable 310 as well as of the arrester cable 304.

Figure 5A:
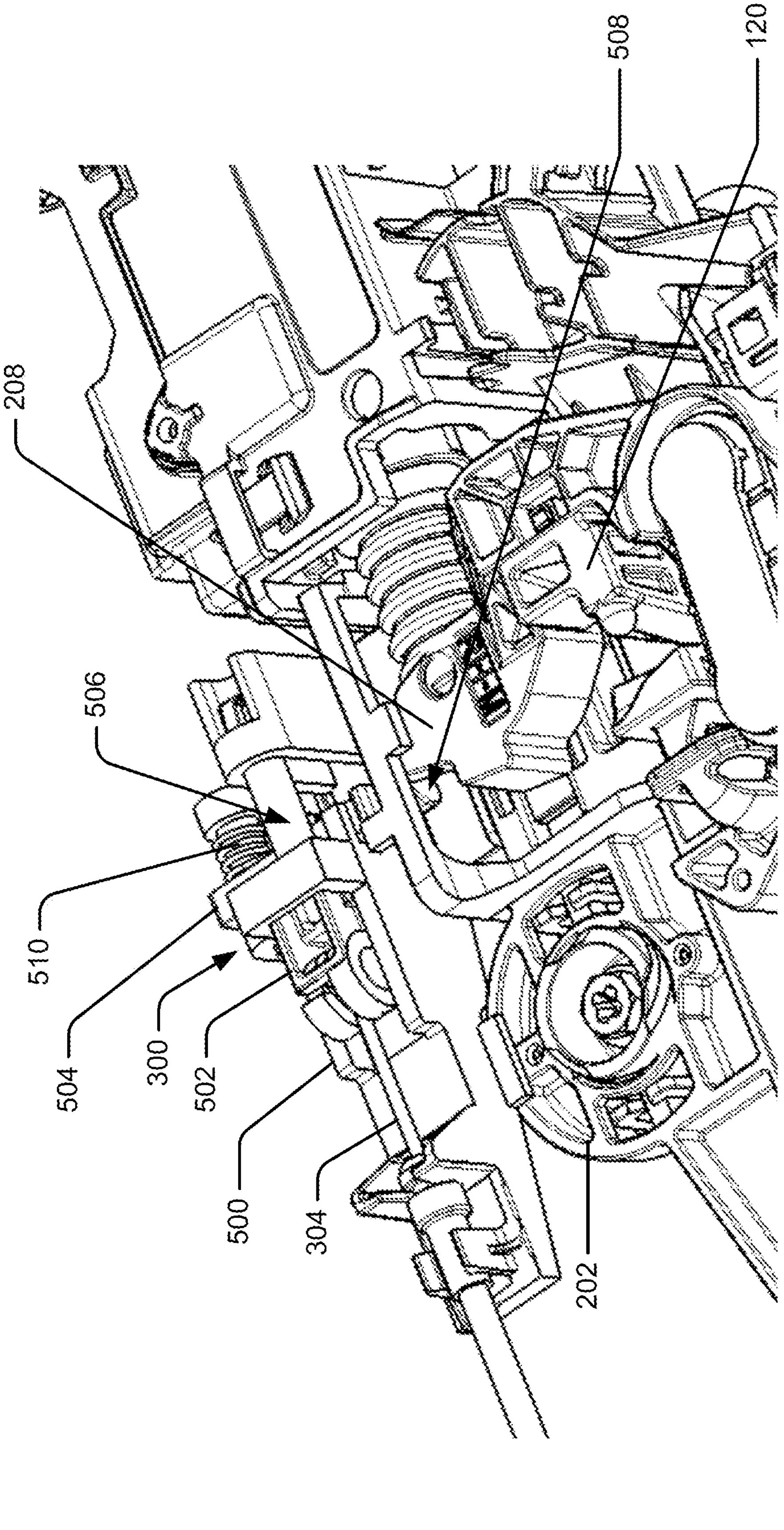
FIGS. 5A-5C illustrate operation of a door operation assembly, according to example implementations of the present subject matter.
Figure 5B:
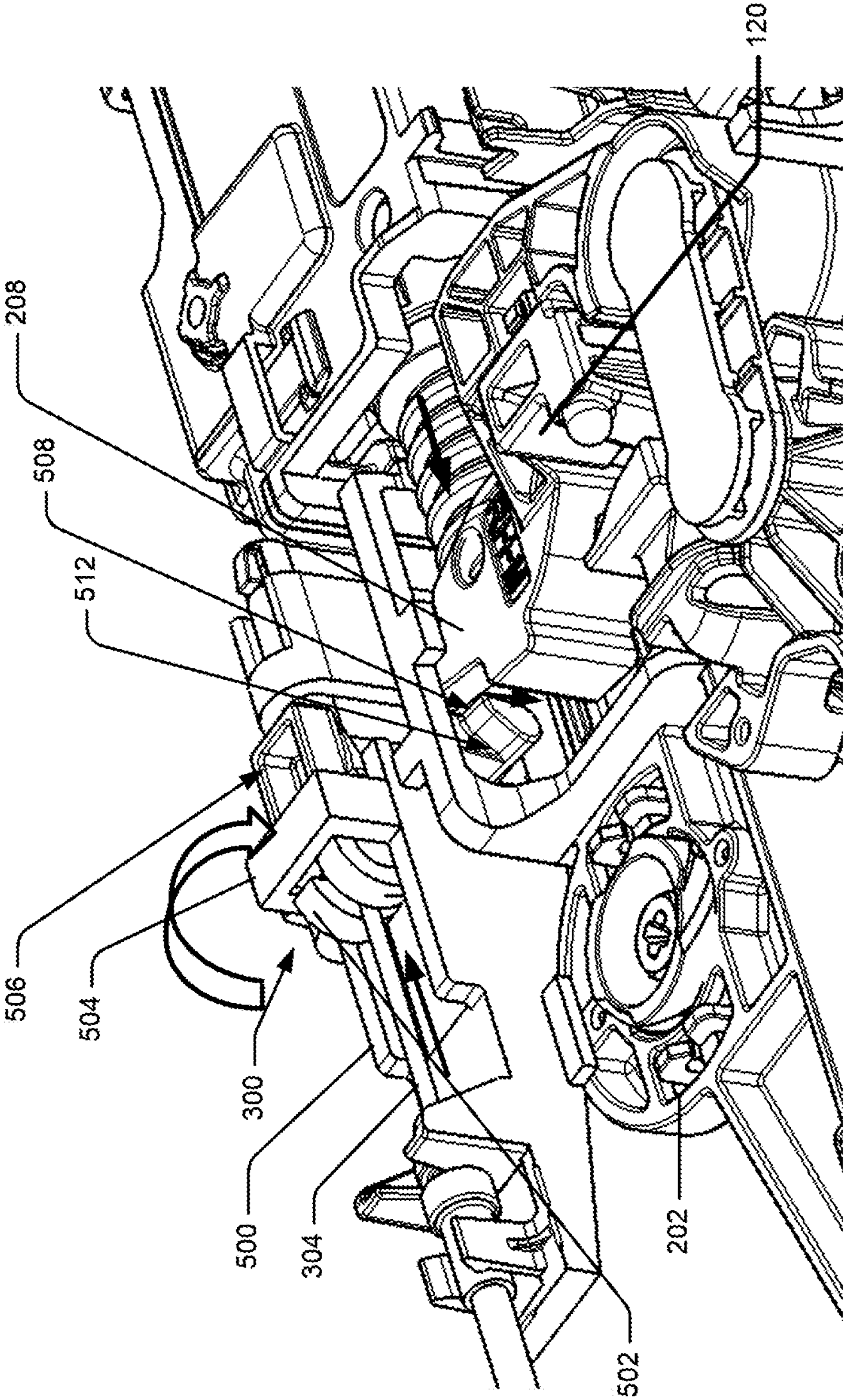
Figure 5C:
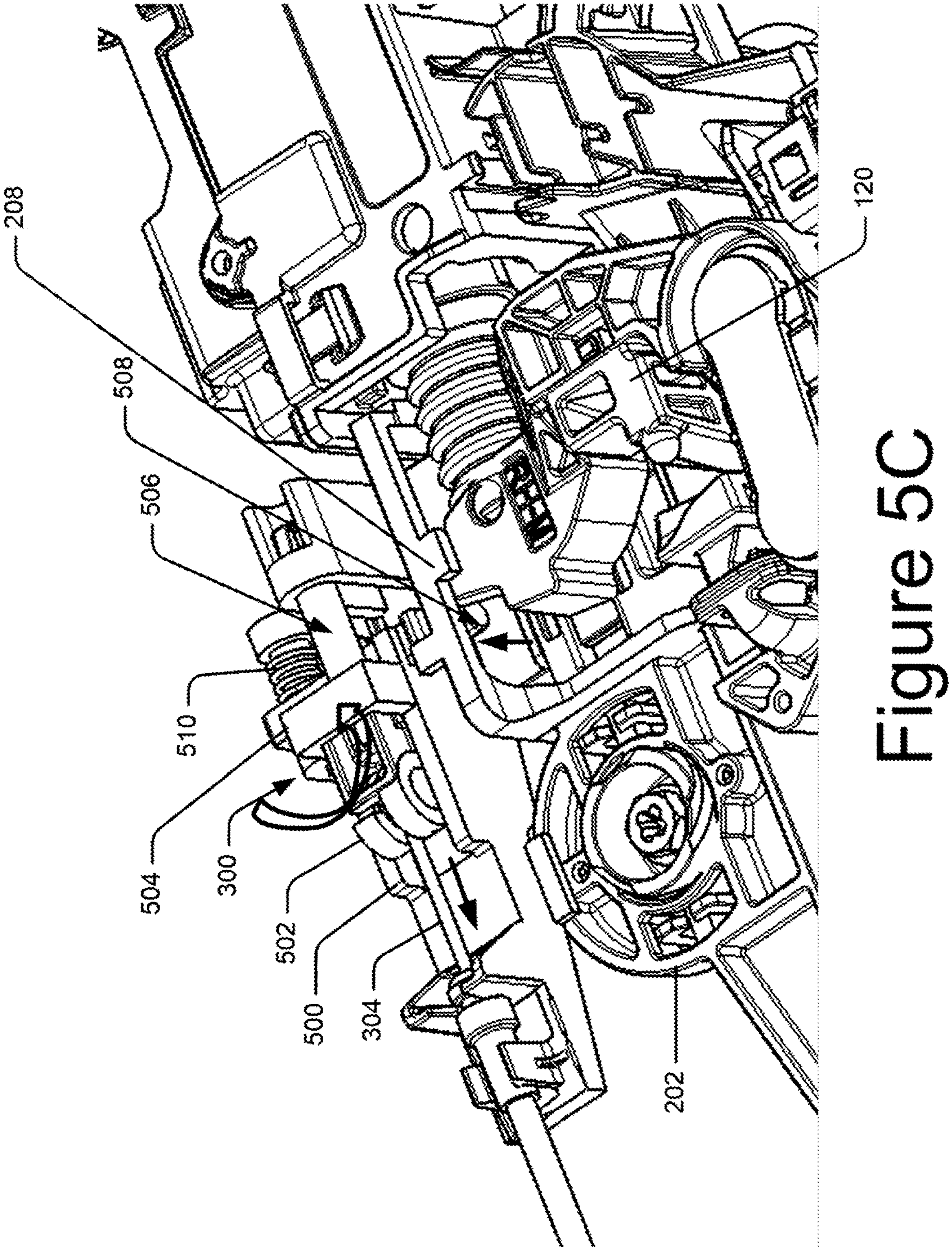

FIGS. 5A, 5B, and 5C illustrate the arrester component 300 and its operation in the door operation assembly 100 for arresting the movement of the outside door handle 120, according to an example of the present subject matter. FIG. 5A illustrates the position of components of the door operation assembly 100, including the position of the arrester component 300, when the vehicle is in the locked state. FIG. 5B illustrates the position of components of the door operation assembly 100, including the position of the arrester component 300, when the vehicle is in the unlocked state. And, FIG. 5C illustrates the position of components of the door operation assembly 100, including the position of the arrester component 300, when the vehicle is locked again, i.e., brought from the unlocked state to locked state. For the sake of brevity, FIGS. 5A, 5B, and 5C are explained together and in no particular order.

In an example, the arrester component 300 can include a housing 500 which can hold an activator/deactivator 502 and a barrier 504. According to an aspect, the activator/deactivator 502 can be responsible for translating the signals from the door locking mechanism 102 or the inside lock actuator 116 (i.e., signals which indicate the state of locking or unlocking of the vehicle) into causing the restriction on the movement of the outside door handle 120. For instance, the activator/deactivator 502 may cause the barrier 504 to restrict the motion of the outside door handle 120, when the vehicle is in the locked condition. In one example, the activator/deactivator 502 can be a mechanical component, while in other examples, the activator/deactivator 502 may be an electronic component.

In the former example, i.e., in which the activator/deactivator 502 is a mechanical component, in one case, the activator/deactivator 502 can be disposed in the housing 500 to be capable to exhibit reciprocatory translational motion with respect to the housing 500. On an outer wall, the activator/deactivator 502 can have a tapered profile 506 which extends along a length of the activator/deactivator 502. Further, the activator/deactivator 502 is connected to the arrester cable 304 such that the motion of locking or unlocking of the vehicle door, which causes movement of the arrester cable 304 as explained above, can cause the motion of the activator/deactivator 502. For instance, the activator/deactivator 502 can be spring-loaded so as to exhibit the reciprocatory translational motion and assist the operation of the arrester cable 304 in moving the activator/deactivator 502 in the active (vehicle locked) state and in the inactive (vehicle unlocked) state. In other case, however, since the activator/deactivator 502 is actuated by the arrester cable 304, it may not be spring loaded.

Further, in said case, the barrier 504 can act as a follower with the tapered profile 506 on the activator/deactivator 502 acting as a cam profile. Accordingly, upon movement of the activator/deactivator 502 due to the movement of the arrester cable 304 when the vehicle is locked or unlocked, the barrier 504 can move along the tapered profile 506 so as to exhibit a reciprocatory motion with respect to the activator/deactivator 502 (which is explained later), by which the barrier 504 can be activated (in the vehicle locked state) or deactivated (in the vehicle unlocked state) to either restrict the movement of the outside door handle 120 or allow movement of the outside door handle 120. As shown in FIG. 5A-5C and as will be explained later, the barrier 504 can cooperate with the actuator 208 of the outside door handle assembly 106 and regulate its movement at different stages of operation. In an example, the barrier 504 can include a contoured mating portion 508 which can cooperate with the actuator 208 to—(1) allow the movement of the outside door handle 120 from flush to deployed condition when the barrier 504 is deactivated in the vehicle unlocked state, (2) block the movement of the outside door handle 120 from flush to deployed condition when the barrier 504 is activated in the vehicle locked condition, (3) even when the barrier 504 is activated, i.e., the vehicle is locked, allow the outside door handle 120 to move from the deployed to flush position but disallow it to be deployed again if the vehicle remains in the locked condition.

As explained above, the barrier 504 can be designed to also exhibit a reciprocatory motion as it moves along the tapered profile 506 of the activator/deactivator 502. In one example, as shown in FIGS. 5A to 5C, the barrier 504 may be pivoted to the housing 500 at one end and, about the pivoted point, the remaining part of the barrier 504 can exhibit reciprocatory translational motion. In other examples, the barrier 504 may be movable coupled to the housing in such a manner that it is still capable of exhibiting reciprocatory translational motion when caused to so move by the activator/deactivator 502.

In said examples, the barrier 504 may be spring-loaded, for example, at the point of connection to the housing 500, so as to automatically come back to a home position upon removal of an external force. The external force is applied to the barrier to overcome the spring force, for instance, when the lock is in an unlocked state, and move the barrier away from a home position). For instance, the home position of the barrier 504, as shown in FIGS. 5A-5C, i.e., when the spring 510 (torsion spring) is not loaded, is when the vehicle is locked and the barrier 504 is engaged with the actuator 208. However, the barrier 504 can be appropriately designed so that the home position can be as per the requirement of the design of the arrester component 300 or of the door operation assembly 100 in general.

Therefore, the translational motion of the activator/deactivator 502 in one direction can cause such a motion of the barrier 504 that the distance of the barrier 504 from the central longitudinal axis of the activator/deactivator 502 changes as it moves along the tapered profile 506. The two extreme positions of the barrier 504— one where the barrier 504 is closest to the central longitudinal axis and the other where the barrier 504 is farthest from the central longitudinal axis— indicate the deactivated and activated positions of the barrier 504, correlated with vehicle locking state, as explained above. Therefore, to reiterate, the toggling of the state of the vehicle locking causes the activator/deactivator 502 to toggle between active state (in which it causes the barrier 504 to be activated to block the movement of the outside door handle 120) and the inactive state (in which it causes the barrier 504 to be deactivated and to not block the movement of the outside door handle 120).

In operation of one example, as shown in FIG. 5A, when the vehicle door is in the locked condition, the contoured mating portion 508 of the barrier 504 abuts against the actuator 208 and blocks the movement of the actuator 208 in the direction that it can be deployed, thereby retaining the outside door handle 120 in the flush position. In this condition, the actuator is in a first extreme position as shown in FIG. 5A.

From this condition, the state of locking of the vehicle can change, i.e., the vehicle can be unlocked. The unlocking of the vehicle can be achieved either by operating the lock of the door locking mechanism 102 or by actuating the inside lock actuator 116. In either case, the inside lock/unlock cable 108 can be actuated. For instance, either the lock-side cable 310 or the door-side cable 312 can be actuated upon unlocking the vehicle, which can cause the movement of the arrester cable 304, through the cable splitter 302 and the cable slider 308.

The arrester cable 304 causes the translational movement of the activator/deactivator 502 with respect to the barrier 504 which brings the activator/deactivator 502 in the inactive state. The movement of the activator/deactivator 502 causes the movement of the barrier 504, thereby deactivating the barrier 504 and disengaging the contoured mating portion 508 of the barrier 504 from the actuator 208. Therefore, the impediment to the movement of the actuator 208 is removed (this is illustrated in FIG. 5B) and the actuator 208 can move which means that the outside door handle 120 is now free to move from the flush to deployed state.

From the unlocked state, when the vehicle door is locked again, as shown in FIG. 5C, the activator/deactivator 502 and the barrier 504 are brought back into the activated condition, i.e., back to the position shown in FIG. 5A. At the time of change of the state of locking the vehicle however, if the outside door handle 120 is in the deployed condition, then the barrier 504 is activated due to the locking of the vehicle door but the activation of the barrier 504 may not change the position of the outside door handle 120. In other words, while the barrier 504 is activated (upon locking of the vehicle door) to block the movement of the actuator 208, the actuator 208 is still in a second extreme position (in which it arrives upon being unblocked and then being actuated— not shown in the Figures), i.e., corresponding to the deployed condition of the outside door handle 120. In such a condition, the actuator 208 abuts against the slanted contour 512 of the contoured mating portion 508 of the barrier 504. When the outside door handle 120 is now manually actuated from the deployed to flush position, the actuator 208 moves against the slanted contour 512 causing the barrier 504 to exhibit translational motion and move out of the way of the actuator 208. As the outside door handle 120 reaches the flush position, the actuator crosses the slanted contour 512 and moves beyond the barrier 504, causing the spring-loaded barrier 504 to come back to be in the activated state, i.e., to be back in the way of the actuator 208 to block its movement. Therefore, as mentioned above, even when the barrier 504 is activated, i.e., the vehicle is locked but the outside door handle 120 is in the deployed condition, the design of the arrester component 300 allows the outside door handle 120 to move from the deployed to flush position but disallows it to be deployed again if the vehicle remains in the locked condition.

Although the present subject matter has been described with reference to specific embodiments, this description is not meant to be construed in a limiting sense. Various modifications of the disclosed embodiments, as well as alternate embodiments of the subject matter, will become apparent upon reference to the description of the subject matter.

We claim:

1. A vehicle comprising:

a door operation assembly comprising:

a door locking mechanism disposed in a vehicle door for at least one of locking and unlocking of the vehicle door;

a latching mechanism disposed in the vehicle door for at least one of latching and delatching the vehicle door;

an internal door handle assembly provided on an interior surface of the vehicle door, wherein the internal door handle assembly is operably coupled to the door locking mechanism to at least one of lock and unlock the vehicle door and operably coupled to the latching mechanism to delatch the vehicle door;

an outside door handle assembly provided on an exterior surface of the vehicle door, the outside door handle assembly comprising:

an outside door handle operably coupled to the latching mechanism to at least delatch the vehicle door, wherein the outside door handle is movable between a flush position and a deployed position; and an arrester component mounted to the outside door handle assembly, the arrester component comprising:

a housing;

a barrier mounted to the housing and movable therein, wherein the barrier is to cooperate with the outside door handle; and an activator/deactivator disposed in the housing, wherein the activator/deactivator is to use an input corresponding to a state of locking or unlocking of the vehicle door to cause movement of the barrier to regulate movement of the outside door handle of the door operation assembly, wherein, when the vehicle door is in a locked state and if the outside door handle is in the flush position, the activator/deactivator causes the barrier to arrest the movement of the outside door handle from the flush position to the deployed position;

when the vehicle door is in the locked state and if the outside door handle is in the deployed position, the activator/deactivator causes the barrier to allow the movement of the outside door handle from the deployed position to the flush position;

wherein the arrester component comprises an arrester cable connecting the activator/deactivator to the door locking mechanism to determine the state of locking or unlocking of the vehicle door, wherein the arrester cable is to move based on operation of the door locking mechanism to cause actuation of the activator/deactivator.

2. The vehicle as claimed in claim 1, wherein when the vehicle door is in an unlocked state, the activator/deactivator is to cause the barrier to disengage from the outside door handle to allow the movement of the outside door handle.

3. The vehicle as claimed in claim 1, wherein the internal door handle assembly comprises:

an inside lock actuator actuable for locking and unlocking of the vehicle door;

a door-side cable to couple the inside lock actuator to the door locking mechanism through the arrester cable, and wherein the door locking mechanism comprises a lock-side cable coupled to the arrester cable, wherein the actuation of the inside lock actuator is to move the arrester cable through the door-side cable and the lock-side cable.

4. The vehicle as claimed in claim 3, wherein the door operation assembly comprises a cable splitter to couple the arrester cable to the door-side cable and the lock-side cable, the cable splitter comprising:

a cable holder casing;

a cable slider slidably disposed in the cable holder casing to at least one of transfer and divide the movement of the lock-side cable and of the door-side cable to the arrester cable, wherein the cable slider comprises:

a first end coupled to the door-side cable and the arrester cable, and a second end opposite the first end, the second end coupled to the lock-side cable, wherein the cable splitter is to:

transfer movement of the lock-side cable in substantially equal measure to the door-side cable and to the arrester cable, and transfer movement of the door-side cable in substantially equal measure to the lock-side cable and to the arrester cable.

5. The vehicle as claimed in claim 1, wherein the barrier and the activator/deactivator are in a cam-follower relationship.

6. The vehicle as claimed in claim 5, wherein an outer wall of the activator/deactivator has a tapered profile extending along a length of the activator/deactivator.

7. The vehicle as claimed in claim 1, wherein the door operation assembly comprises a control unit, wherein the control unit is coupled to the arrester component, wherein the control unit is to:

receive the input corresponding to state of locking or unlocking of the vehicle; and in response to the input, actuate the barrier to regulate the outside door handle of the door operation assembly.

8. An arrester component for a door operation assembly of a vehicle, the arrester component comprising:

a housing;

a barrier mounted to the housing and movable therein, wherein the barrier is configured to cooperate with an outside door handle of the door operation assembly; and an activator/deactivator disposed in the housing, wherein the activator/deactivator is configured to use an input corresponding to a state of locking or unlocking of a vehicle door and to cause movement of the barrier to regulate the outside door handle of the door operation assembly between a flush position and a deployed position;

wherein the arrester component comprises an arrester cable connecting the activator/deactivator to a door locking mechanism to determine the state of locking or unlocking of the vehicle door, wherein the arrester cable is to move based on operation of the door locking mechanism to cause actuation of the activator/deactivator.

9. The arrester component as claimed in claim 8, wherein the barrier is engageable with an actuator of the door operation assembly to regulate the movement of the outside door handle to the flush position and to the deployed position.

10. The arrester component as claimed in claim 9, wherein the barrier comprises:

a contoured mating portion comprising a slanted contour engageable with the actuator to regulate the movement of the outside door handle, the barrier being mounted to the housing to be movable between a first position and a second position, the first position being a position where the barrier is closest to a central longitudinal axis of the activator/deactivator and the second position being a position where the barrier is farthest from the central longitudinal axis of the activator/deactivator.

11. The arrester component as claimed in claim 10, wherein the barrier is mounted to the housing by a first spring, wherein the first spring is a torsion spring to bias the barrier towards the second position.

12. The arrester component as claimed in claim 8, wherein the barrier and the activator/deactivator are in a cam-follower relationship.

13. The arrester component as claimed in claim 8, wherein an outer wall of the activator/deactivator has a tapered profile extending along a length of the activator/deactivator.

14. The arrester component as claimed in claim 8, wherein the arrester component is couplable to a control unit of the door operation assembly to:

receive the input corresponding to state of locking or unlocking of the vehicle; and in response to the input, actuate the barrier to regulate the outside door handle of the door operation assembly.

15. A vehicle comprising:

a door operation assembly comprising:

a door locking mechanism disposed in a vehicle door for at least one of locking and unlocking of the vehicle door;

a latching mechanism disposed in the vehicle door for at least one of latching and delatching the vehicle door;

an internal door handle assembly provided on an interior surface of the vehicle door, wherein the internal door handle assembly is operably coupled to the door locking mechanism to at least one of lock and unlock the vehicle door and operably coupled to the latching mechanism to delatch the vehicle door;

an outside door handle assembly provided on an exterior surface of the vehicle door, the outside door handle assembly comprising:

an outside door handle operably coupled to the latching mechanism to at least delatch the vehicle door, wherein the outside door handle is movable between a flush position and a deployed position;

wherein the outside door handle assembly comprises an actuator coupled to the outside door handle; and an arrester component mounted to the outside door handle assembly, the arrester component comprising:

a housing;

a barrier mounted to the housing and movable therein, wherein the barrier is to cooperate with the outside door handle, wherein the barrier is engageable with the actuator of the outside door handle to regulate the movement thereof; and an activator/deactivator disposed in the housing, wherein the activator/deactivator is to use an input corresponding to a state of locking or unlocking of the vehicle door to cause movement of the barrier to regulate movement of the outside door handle of the door operation assembly, wherein, when the vehicle door is in a locked state and if the outside door handle is in the flush position, the activator/deactivator causes the barrier to arrest the movement of the outside door handle from the flush position to the deployed position;

when the vehicle door is in the locked state and if the outside door handle is in the deployed position, the activator/deactivator causes the barrier to allow the movement of the outside door handle from the deployed position to the flush position.

16. The vehicle as claimed in claim 15, wherein the barrier comprises a contoured mating portion comprising a slanted contour engageable with the actuator to regulate the movement of the outside door handle, the barrier being mounted to the housing to be movable between a first position and a second position, the first position being a position where the barrier is closest to a central longitudinal axis of the activator/deactivator and the second position being a position where the barrier is farthest from the central longitudinal axis of the activator/deactivator.

17. The vehicle as claimed in claim 16, wherein when the vehicle door is in the locked state and if the outside door handle is in the flush position, the contoured mating portion of the barrier is configured to abut against the actuator to arrest the movement of the outside door handle from the flush position to the deployed position.

18. The vehicle as claimed in claim 16, wherein when the vehicle door is brought to the locked state from the unlocked state and if the outside door handle is in the deployed position, the slanted contour of the barrier is to move the actuator to bring the outside door handle from the deployed position to the flush position, wherein the movement of the outside door handle to the flush position is to move the actuator beyond the slanted contour of the barrier causing the barrier to return to the first position, the movement of the barrier to the first position is to restrict the movement of the actuator to bring the outside door handle from the flush position to the deployed position.

19. The vehicle as claimed in claim 16, wherein the arrester component comprises an arrester cable connecting the activator/deactivator to the door locking mechanism to determine the state of locking or unlocking of the vehicle door, wherein when the vehicle door is brought to the unlocked state from the locked state and if the outside door handle is in the flush position, the unlocking of the vehicle door is to move the arrester cable, the movement of the arrester cable is to cause translational movement of the activator/deactivator with respect to the barrier, the movement of the activator/deactivator is to cause the movement of the barrier towards the second position, the movement of the barrier towards the second position is to disengage the contoured mating portion of the barrier from the actuator, wherein the actuator is movable to actuate the outside door handle from the flush position to the deployed position.

20. The vehicle as claimed in claim 15, wherein the barrier and the activator/deactivator are in a cam-follower relationship.

21. The vehicle as claimed in claim 20, wherein an outer wall of the activator/deactivator has a tapered profile extending along a length of the activator/deactivator.

22. The vehicle as claimed in claim 15, wherein when the vehicle door is in an unlocked state, the activator/deactivator is to cause the barrier to disengage from the outside door handle to allow the movement of the outside door handle.

23. The vehicle as claimed in claim 22, wherein the internal door handle assembly comprises:

an inside lock actuator actuable for locking and unlocking of the vehicle door;

a door-side cable to couple the inside lock actuator to the door locking mechanism through an arrester cable, and wherein the door locking mechanism comprises a lock-side cable coupled to the arrester cable, wherein the actuation of the inside lock actuator is to move the arrester cable through the door-side cable and the lock-side cable.

* * * * *